(12) United States Patent
Long (10) Patent No.: US 6,781,270 B2
(45) Date of Patent: Aug. 24, 2004

(54) MAGNETICALLY COUPLED DANGLING APPARATUS

(75) Inventor: Johnny D. Long, Powell, TN (US)

(73) Assignee: Harmonic Drive, Inc., Knoxville, TN (US)

( * ) Notice: Subject to any disclaimer, the term of this patent is extended or adjusted under 35 U.S.C. 154(b) by 89 days.

(21) Appl. No.: 10/142,124

(22) Filed: May 9, 2002

(65) Prior Publication Data

US 2002/0167239 A1 Nov. 14, 2002

Related U.S. Application Data

(60) Provisional application No. 60/289,871, filed on May 9, 2001.

(51) Int. Cl.$^7$ .............................. H02K 7/09; G09F 19/00
(52) U.S. Cl. ...................... 310/90.5; 310/152; 40/426; 446/133
(58) Field of Search ........................... 310/37, 80, 152, 310/90.5; 40/426; 446/129, 131, 132, 133

(56) References Cited

U.S. PATENT DOCUMENTS

| | | | |
|---|---|---|---|
| 3,360,703 A | | 12/1967 | Reich |
| 3,478,466 A | * | 11/1969 | Conner ...................... 446/131 |
| 4,151,431 A | | 4/1979 | Johnson |
| 4,242,591 A | | 12/1980 | Harville |
| 4,304,256 A | | 12/1981 | Taiani |
| 4,367,448 A | | 1/1983 | Nishizako |
| 4,566,694 A | | 1/1986 | Ehrat |
| 4,571,528 A | | 2/1986 | McGee et al. |
| 4,585,282 A | | 4/1986 | Bosley |
| 4,600,849 A | | 7/1986 | Lawson |
| 4,643,604 A | * | 2/1987 | Enrico ......................... 401/131 |
| 4,727,299 A | | 2/1988 | Liu |
| 4,754,207 A | | 6/1988 | Heidelberg |
| 5,146,701 A | * | 9/1992 | Lee .............................. 40/406 |
| 5,295,031 A | | 3/1994 | Wasson |
| 5,415,140 A | | 5/1995 | Rigazzi |
| 5,462,472 A | | 10/1995 | Lin |
| 5,506,459 A | * | 4/1996 | Ritts .......................... 310/90.5 |
| 5,541,460 A | | 7/1996 | Dunfield et al. |
| 5,578,882 A | | 11/1996 | Dunfield et al. |
| 5,585,680 A | | 12/1996 | Tsoffka |
| 5,589,721 A | * | 12/1996 | Han et al. ................... 310/90.5 |
| 5,606,230 A | | 2/1997 | Drury et al. |
| 5,610,463 A | | 3/1997 | Dunfield et al. |
| 5,619,083 A | | 4/1997 | Dunfield et al. |
| 6,176,609 B1 | | 1/2001 | Cleveland et al. |

\* cited by examiner

Primary Examiner—Burton Mullins
(74) Attorney, Agent, or Firm—Pitts & Bristtian PC (57) ABSTRACT

An apparatus for producing magnetically induced movement of a second member in relation to a first member. The apparatus includes a first member having at least one perimeter magnet disposed thereon. The first member and at least one perimeter magnet are pivotable in relation to an axial member central of the first member. A second magnet is disposed central of the at least one perimeter magnet, with the second magnet disposed on a second member that is reciprocatable in relation to the first member as the second magnet is alternately attracted and repelled by magnetic forces of the at least one first magnet, and is also moved by gravitational force. Additional perimeter magnets and axial magnets are disposed in relation to the at least one perimeter magnet and the second magnet to convert motion of the first member into movement of the second member for recreational and energy conversion applications.

20 Claims, 8 Drawing Sheets

MAGNETICALLY COUPLED DANGLING APPARATUS

CROSS REFERENCE TO RELATED APPLICATIONS

This application claims the benefit of U.S. Provisional Application No. 60/289,871, filed May 9, 2001.

STATEMENT REGARDING FEDERALLY SPONSORED RESEARCH OR DEVELOPMENT

Not Applicable.

BACKGROUND OF THE INVENTION

1. Field of Invention

This invention pertains to an apparatus for motion conversion using magnets that convert reciprocating movement into linear or rotational motion. More particularly, this invention pertains to a plurality of magnets disposed proximal to each other for conversion of reciprocating or random movement into useful motion.

2. Description of the Related Art

Prior magnetic drive mechanisms include a combination of a rotor and a stator with the rotor having at least one magnet thereon for rotation about the stator. According to magnetic principles, magnetic fields of rotors and stators interact in symmetrical alignment in radial fashion and concentric relationship with a magnetically driven output shaft. Magnetic or electromagnetic components of prior magnetic drive mechanisms rotate to a top, dead or center position, utilizing skewed magnetic lines as the components seek alignment and de-energizing prior to a top, dead or center position by timing methods to allow the rotor to continue in a rotational path. In prior magnetic drive mechanisms the stator includes a plurality of inwardly oriented poles and the rotor includes a plurality of outwardly oriented poles. In basic electromagnetic motor designs, the speed of the output shaft is a function of the frequency with which the polarities and voltages are alternated in relation to proper timing of the rotation and orientation of the respective magnetic fields generated to influence the rotor and/or the stator. Timing is addressed by coil arrangements, voltage frequency, reversal of current and electronic controls known to those skilled in the art.

One example of a prior art device is an electromagnetic rotary motor with a rotor means and a stator means. The stator means includes a permanent magnet means having a pair of magnets with pole faces that define a gap between the faces with a generally uniform magnet flux density across the gap. An entrance section, an exit section and a generally curved longitudinal path extend across the gap from the entrance section to the exit section around a transverse axis. The magnetic flux density changes as one moves from the entrance section to the exit section as a function of arc degree position around the transverse axis. The rotor means includes a predetermined number of permanent magnets disposed radially outward from the rotor axis. The rotor magnets are disposed substantially within the gap and the magnetic field of each rotor magnet interacts with the magnetic field of the stator magnets through repulsion or attraction. The rotary motor requires an electronic control means to induce an electromagnetic field that interacts with a magnetic field of the rotor magnet or the stator magnets to selectively enhance or retard the rotational speed of the rotor around a transverse axis. A timing circuitry determines when the electromagnet is energized, which in turn determines how quickly the electromagnet sequentially repels or attracts the rotor permanent magnets. The electromagnetic rotor motor is electrically connected to an external source of electrical energy for inducing an electromagnetic field that is responsive to the relative rotational position of the rotor magnets and the magnetic field of the stator means.

Another example of a prior art device is a rotating apparatus including a first group of members having magnets thereon and a second group of members having magnets thereon. A reciprocating rectilineal motion is created by the interaction between the first group of members having magnets thereon and the second group of members having magnets thereon, without any mechanical connection or contact between the same two members or groups of members having magnets thereon. The reciprocating rectilineal motion is obtained by connecting one of the two groups of magnets to pistons of a internal combustion engine and connecting the second of the two groups of magnets to a cylinder or magnet rotor of the engine. An outward stroke of a piston due to gas expansion and combustion inside the cylinders is followed by a return stroke of the piston effected by the action of a mechanical-energy-restoring system of the engine and the action of the mutual magnetic attraction between the first and second groups of members having magnets thereon. The reciprocating rectilineal motion of the apparatus moves the first group of members having magnets thereon along a first trajectory and moves the second group of members having magnets thereon along a second trajectory not parallel to the first trajectory during piston movements within an internal combustion engine.

An additional example of a prior art device is a jewelry mounting mechanism that freely rotates in an oscillating manner about a fixed center point. The mechanism includes a mounting base member having a perpendicular mounting stem attached to rotatably support a pendulum member having at least one pair of oppositely disposed magnets radially mounted to rotate about the stem within the base member. Above the pendulum member and freely rotatable about the mounting stem is a jewelry-setting platform having a pair of magnets thereon which are radially aligned with the magnets of the pendulum member so as to be rotatably activated by the movement of the pendulum. The identical magnetic poles of each pair of magnets are juxtaposed, one above the other on different layers of the mechanism, causing a repulsing rotational action between magnets. A pendulum member serves as the rotatable member, with magnets arranged apart on each layer of the ring, bracelet, or locket so that when the first magnets are positioned proximate the second magnets of the jewelry-setting platform, the respective magnets repel and attract each other upon movement by a wearer of the jewelry mounting mechanism.

There is a need for a system for motion and force conversion that utilizes a plurality of magnets oriented for converting linear or nonlinear motion from an external energy source such as the movement of a human, into rotational motion for a pair of rotor magnets radially disposed in relation to a central magnetic element that is attracted or repulsed at multiple pivot angles to cause continuous rotary motion upon movement of the rotor magnets.

BRIEF SUMMARY OF THE INVENTION

According to one embodiment of the present invention, an apparatus and a system is disclosed for producing magnetically induced rotary movement and/or random movement. The apparatus includes a first member having a first surface, and a pivot axis substantially perpendicular to the first surface and passing through an axial member disposed through the first member. At least one first magnet is disposed on the first surface, preferably proximal to a perimeter of the first member, with the first magnet having a first magnet axis defined by a first magnet north pole and a first magnet south pole. A second magnet is attached to the axial member with the second magnet axis and/or the first magnet axis disposed substantially circumferential to the pivot axis of the axial member. A second member is attached to the second magnet with the second member pivoting about the first member as the second magnet is alternately attracted and repulsed by the magnetic forces of the first magnet and alternately moved away from the first magnet by a gravity force.

The at least one first magnet further includes a third magnet that is positioned on a perimeter of the first member and is fixed on the first surface with the second magnet disposed between the first magnet and the third magnet, to allow magnetic interaction between the perimeter magnets and the second magnet. Linear rotation or nonlinear, random motion of the first surface is created due to random motion of the first member as induced by a support member to which the first member is attached. Motion of the perimeter magnets about the second magnet axis creates a reciprocating motion of the second magnet and second member. The first member and/or the second member may be configured to support an article of jewelry, a wind chime, and/or an amusement device, with input energy provided by the motion of a person, by wind, and/or by motion of a boat or land vehicle. Alternative embodiments provide a reciprocating motion of the second member causing the perimeter magnets and the first member to rotate. The second member may include a pendulum member, a central ring magnet, and/or a gimbal sleeve having an additional magnet thereon to provide movement of the second magnet in relation to motion of magnets mounted on or under the first member.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
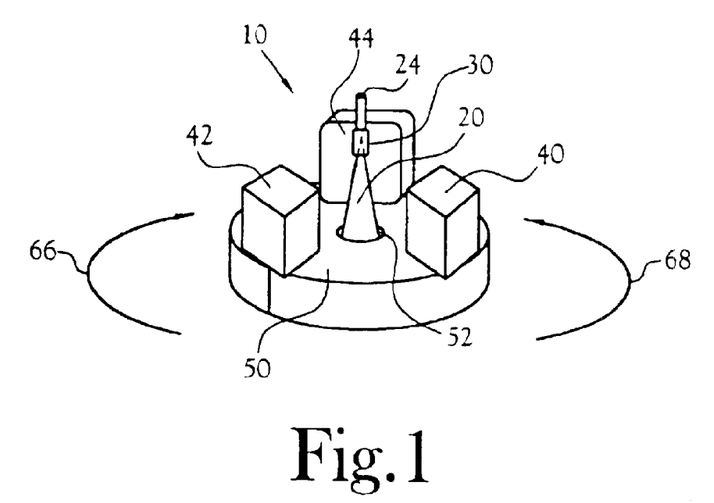
FIG. 1 is a perspective view of the present invention illustrating a first magnet and additional magnets oriented on a first member in relation to an axial member.

An apparatus utilizing a plurality of magnets and a magnetically coupled system is disclosed for conversion of linear or nonlinear random movement into rotational motion by the interaction of magnetic fields created by the north and south magnetic poles of a plurality of magnets positioned in a spaced apart configuration around a pivot axis 20 (see FIG. 1). The apparatus 10 includes an axial member 24 (see FIG. 2), also referred to as a pivot member, with the axial member aligned with the pivot axis 20. The pivot axis 20 serves as a pivot and/or rotational axis about which a first support member 50 is pivoted 54 and/or rotated 66, 68 (see FIGS. 1 and 2). A second magnet 30 is aligned with the axial member 24 and the pivot axis 20 (see FIG. 2). A first magnet 40 having a first magnet axis defined by a first magnet north pole and a first magnet south pole is disposed to rotate in relation to the second magnet 30. The second magnet 30 is attached to the pivot axis 20 with the second magnet axis and/or the first magnet axis disposed substantially circumferential to the pivot axis 20 of the axial member 24. In one embodiment, the second magnet 30 is positioned above the pivot axis 20, and the second magnet 30 is attached to a second member 26. The apparatus 10 further includes at least one first magnet 40 disposed in a spaced apart configuration from the second magnet 30, with the first magnet 40 proximal to a perimeter surface of a first support member 50 (see FIGS. 1 and 2). The first support member 50 provides a support platform for placement of jewelry and/or for attachment of dangling decorative items such as earrings (see FIGS. 3a and 3b). The second member 26 is an elongated member extending from the pivot axis 20 and axial member 24 and provides means for attaching of jewelry, amusement items, and/or dangling decorative items (see FIGS. 2, 3a, 2b, 4a and 4b) to at least one axial member 24.

Figure 2:
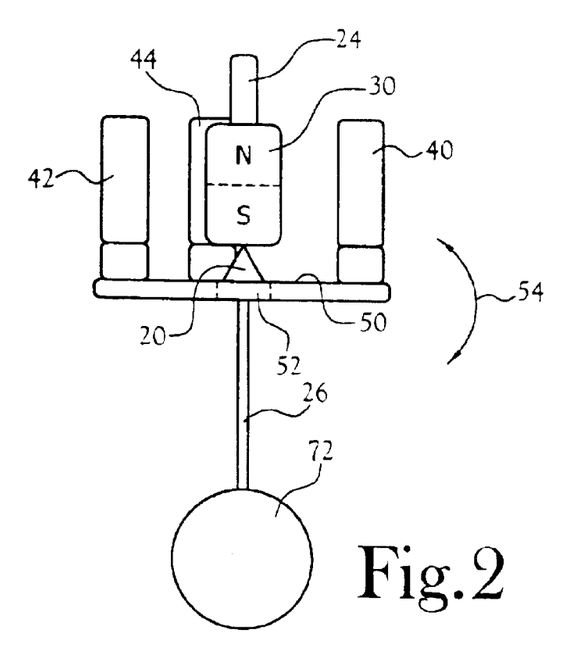
FIG. 2 is a side view of FIG. 1 illustrating an axial member having a dangling second member and an axial magnet positioned proximal to a plurality of first magnets.

In one embodiment illustrated in FIGS. 1 and 2, the first support member 50 includes a center hole 52 through which a pivot axis 20 is extended for rotation of the first support member 50. The first support member 50 includes a plurality of magnets positioned thereon at perimeter surface positions, with the plurality of magnets 40, 42, 44 and first support member 50 rotatable in relation to the pivot axis 20 in a clockwise 66 direction and in a counter-clockwise 68 direction. A supporting axial member 24 is connectable to a second member 26 which is attachable to the pivot axis 20. The second member 26 is disposed to extend below first support member 50 and extends a sufficient length to accept a decorative item such as a spherical member 72 removably attachable thereon (see FIG. 2). Rotational movement of the first support member 50 in relation to the pivot axis 20 and axial member 24 is created by an external force such as the random motion of a person's head or body, providing tilting 54 and/or rotating movement 66, 68 of the first support member 50 and the respective magnets 40, 42, 44. Upon movement of the magnets 40, 42, 44, the magnetic fields of the first magnet north pole and the south pole of each magnet magnets 40, 42, 44 influence the movement of the second magnet 30 aligned with and connected to the axial member 24. Continued reciprocating, rotating, or tilting movement of the first support member 50 moves magnets 40, 42, 44 in relation to the magnetic force of the first magnet 40, respectively attracting and repelling the second magnet 30 with inducement of pivoting or rotation of second magnet 30 and second member 26. An additional force affecting the movement of the magnets 40, 42, 44 on first support member 50 is the influence of a gravity force that periodically moves the magnets 40, 42, 44 in relation to the second magnet 30. Therefore, pivoting or rotational movement of the second magnet 30 is created without physical connections between the magnets 40, 42, 44 and the second magnet 30 other than first support member 50 being supported at pivot axis 20 (see FIG. 2). Rotational movement of the second magnet 30 and second member 26 is maintained with the pivoting or rotating of the magnets 40, 42, 44 on first support member 50. The movement of second member. 26 and axial member 24 provide visual entertainment to one observing motion of jewelry and other adornments attached to the second member 26.

Figure 3A:
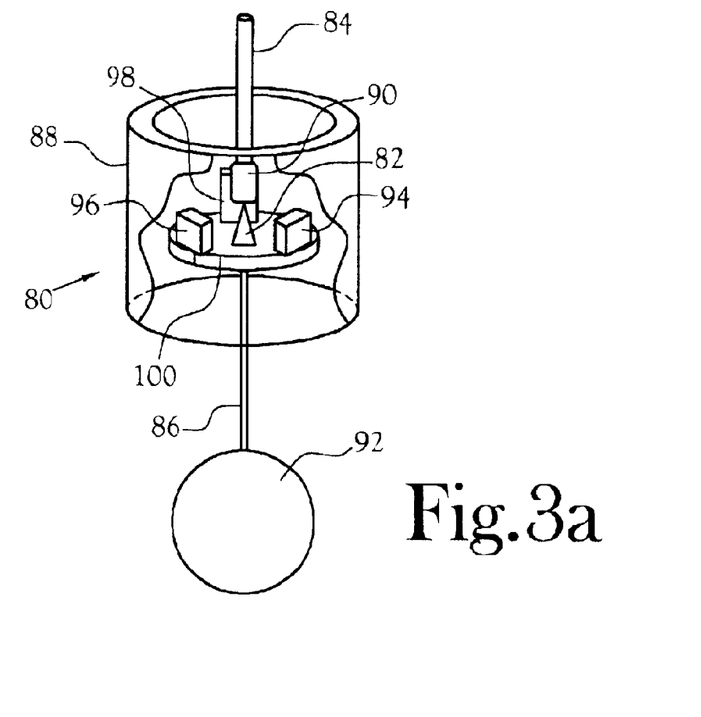
FIG. 3a is a perspective view of the orientation of an axial member having an axial magnet disposed within a plurality of perimeter magnets contained within a cylindrical magnet.
Figure 3B:
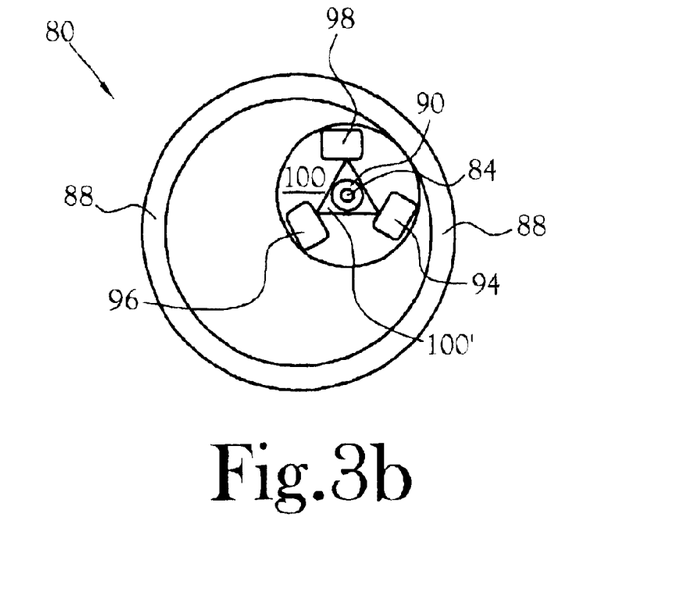
FIG. 3b is a top view of FIG. 3a illustrating the movement of the axial member and the at least two magnets contained within a ring-shaped magnet.

An alternate embodiment is illustrated in FIGS. 3a and 3b, for use in jewelry such as earrings, provides for conversion of linear or nonlinear motion of a first support member 100 having a plurality of first magnets 94, 96, 98 thereon, into rotational motion of axial member 84 interconnected with second member 86, having second magnet 90 disposed above pivot axis 82 and aligned with axial member 84. The first support member 100 and the plurality of first magnets 94, 96,98 are encircled by a cylindrical magnet 88 having an interior surface providing a first magnet pole and an exterior surface providing a second magnet pole. A plurality of magnetic fields are created by the north and south magnetic poles of each of the plurality of first magnets 94, 96, 98 positioned in a spaced apart configuration around the second magnet 90 disposed on a triangular, connector 100' centered around axial member 84. Each of the first magnets have a first magnet axis defined by a first magnet north pole and a first magnet south pole. The second magnet 90 is attached to the axial member with the second magnet axis and/or the first magnet axis disposed substantially circumferential to the pivot axis of the axial member 84. The plurality of magnetic fields provide magnetic attracting and repelling forces to influence rotation of second magnet 90, to provide sufficient energy to force the axial member 84 and second member 86 (see FIG. 3a) to rotate. First support member 100 is moved laterally within a ring-shaped or a cylindrical magnet 88 (see FIG. 3b) by the alternating attraction and repelling of the magnetic fields created by the north and south magnetic poles of each first magnet 94, 96, 98 and cylindrical magnet 88, to provide a rotating movement of second member 86 and attached pendulum member 92 (see FIG. 3a) in relation to axial member 84 and cylindrical magnet 88.

Figures 4A, 4B:
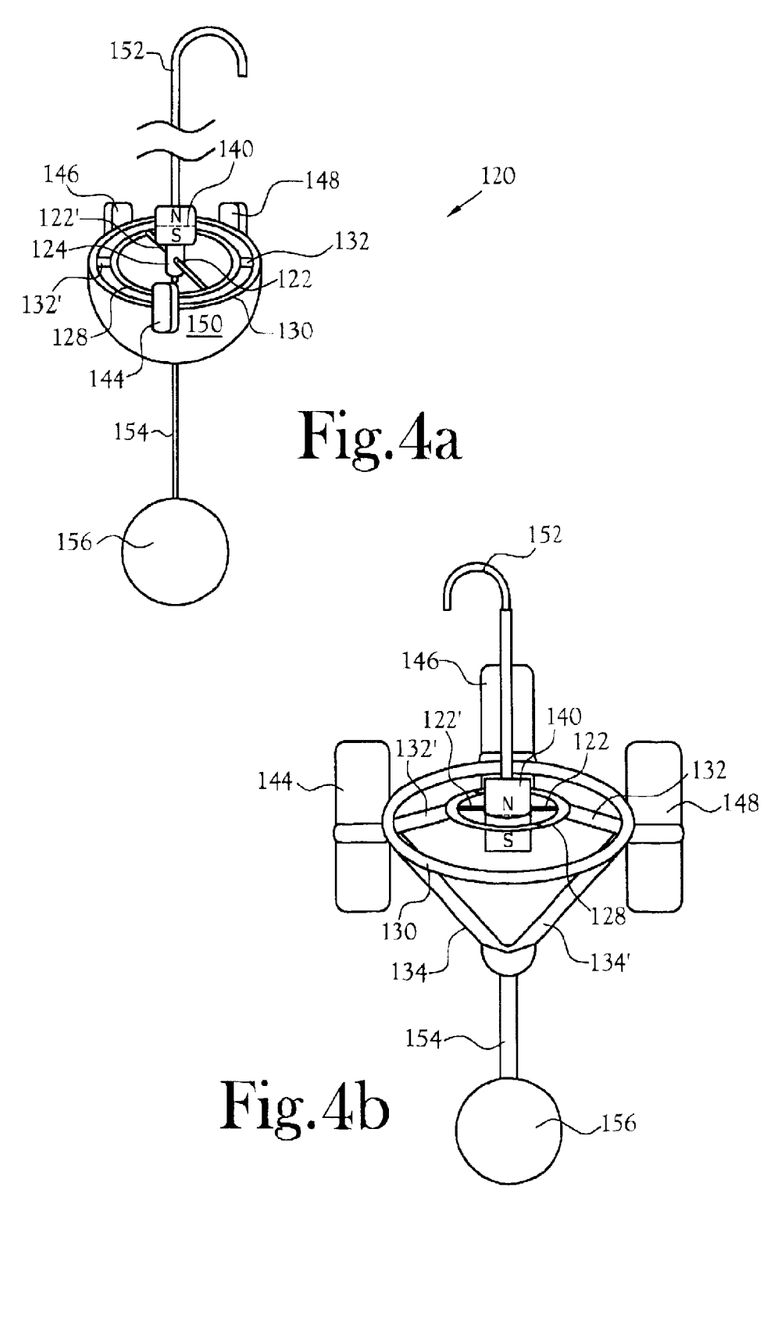
FIG. 4a is a perspective view of the orientation of a gimbal pivoting apparatus having a second magnet disposed within a plurality of first magnets disposed on a cylindrical first member.
FIG. 4b is a perspective view of FIG. 4a illustrating the orientation of a plurality of perimeter magnet positioned along a ring-shaped first member and at least one second magnet supported on an axial member through the ring-shaped first member.

An alternative embodiment is illustrated in FIGS. 4a and 4b, including an amusement device 120 for use in boats or land vehicles. The device 120 includes a central magnet 140 positioned above an axial member 124 serving as a hub for two gimbal pivots 122, 122' that are oriented in a direction lateral from the central magnet 140 (see FIG. 4a). Each gimbal pivot 122, 122' is rotatably connected at an outer end to a first support member such as an inner sleeve perimeter surface 128. The inner sleeve perimeter surface 128 attached by two outer rotating gimbal pivots 132, 132' to an outer sleeve perimeter surface 130 to allow inner sleeve perimeter surface 128 to pivot independently in relation to central magnet 140 and outer sleeve perimeter surface 130. The inner sleeve perimeter surface 128 may have one or more magnets attached thereon (not shown). Outer sleeve bearing 130 is attached to a second support member 150 that encloses the gimbal pivot device and provides support for attachment of a plurality of magnets 144, 146, 148. At a lower portion of second support member 150, an elongated member 154 is connected that extends to a pendulum member 156. As illustrated in FIG. 4b, the second support member 150 can alternatively be configured as a rectangular or triangular shaped frame having a first side support member 134 and a second side support member 134' that are connected at a lower portion to an elongated member 154 that extends to a pendulum member 156. The amusement device 120 may be supported by an attaching means such as a hanger 152 having a first end connected to the amusement device 120, and having a second end releasably attachable to a dash or rear-view mirror of a boat or land vehicle. The random motion of the boat or vehicle provides for movement of the plurality of magnets 144, 146, 148, which are reciprocated in relation to axial member 124 by rotation about the two gimbal pivots 122, 122' and the two outer rotating gimbal pivots 132, 132'. The alternating attraction and repelling of the magnetic fields created by the north and south magnetic poles of each magnet 144, 146, 148 interacting with the magnetic force of central magnet 140 creates movement of elongated member 154 and pendulum member 156 while the hanger 152 is moved by the movement of the boat or land vehicle.

Figures 5A, 5B:
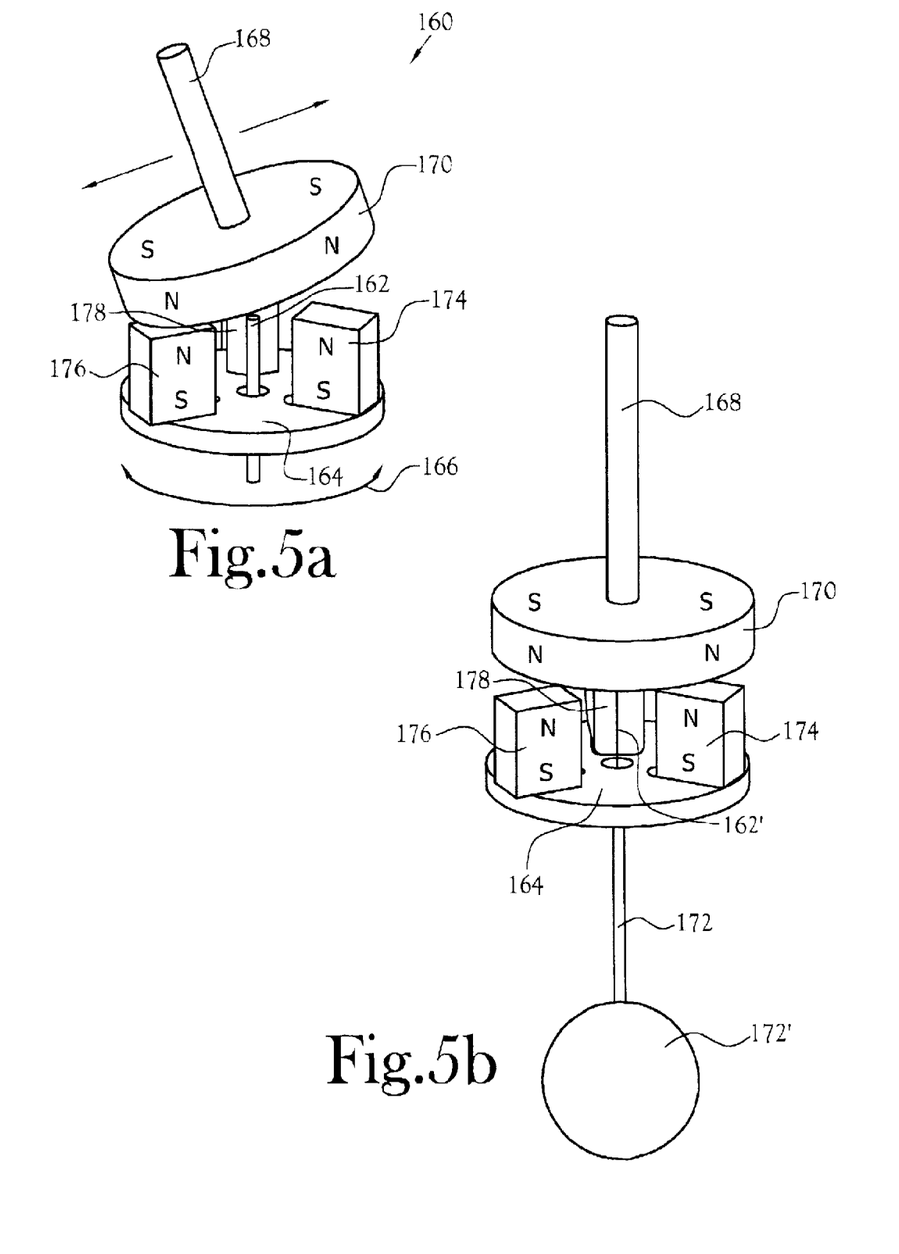
FIG. 5a is a perspective view of an alternative embodiment of FIG. 1 illustrating a plurality of first magnets on a first member rotatable in relation to an axial member having a second magnet positioned above the first magnets.
FIG. 5b is a perspective view of FIG. 5a illustrating the orientation of the pivoting magnet positioned above the plurality of first magnets and having a pendulum member attached below the first magnets.

An alternative embodiment is illustrated in FIGS. 5a and 5b, including a pendulum system 160 having at least one pendulum magnet 170 suspended as a pendulum above a plurality of perimeter magnets 174, 176, 178 supported on a rotatable first support member 164. The rotating movement of the plurality of perimeter magnets 174, 176, 178 the rotation 166 of first support member 164, are created by the swinging of pendulum magnet 170 suspended above an axial member 162 serving as a pivot (see FIGS. 5a). Alternatively, the pivot may include a pivot wire 162' connected between the lower central portion of pendulum magnet 170, and the axial member 172 of the counter-weight 172' (see FIG. 5b). The swinging pendulum magnet 170 is suspended by an axial member 168 that is supportable within an enclosing frame (not shown). When the enclosing frame is reciprocated, for example during attachment to a moving transport vehicle, the reciprocating motion of the transport vehicle provides for swinging of the axial member 168 and pendulum magnet 170, with a result of repetitive movement of the magnet 170 proximal to the magnetic fields created by the north and south magnetic poles of each perimeter magnet 174, 176, 178. The perimeter magnets 174, 176, 178 may each have a magnet north pole oriented toward the pendulum magnet 170, or may each have a magnet south pole oriented toward the pendulum magnet 170, or may have a first side and a second side having respective north and south poles oriented perpendicular to the pendulum magnet 170. An additional embodiment for the perimeter magnets 174, 176, 178 include an interior north or south pole oriented toward the axial pivot wire 162', with an opposite south or north pole oriented outwards toward the perimeter surface of first support member 164. For each movement of pendulum magnet 170 through the magnetic fields created by the north and south magnetic poles of each perimeter magnet 174, 176, 178, the first member 164 is rotated in relation to axial member 162 (see FIG. 5a), or rotated in relation to the pivot wire 162', with resulting rotation of the elongated member 172 and counter-weight 172'. The rotation of elongated member 172 and counter-weight 172' can be utilized as a power generation system for powering a circuit for generating electric recharging current (not shown).

Figure 6:
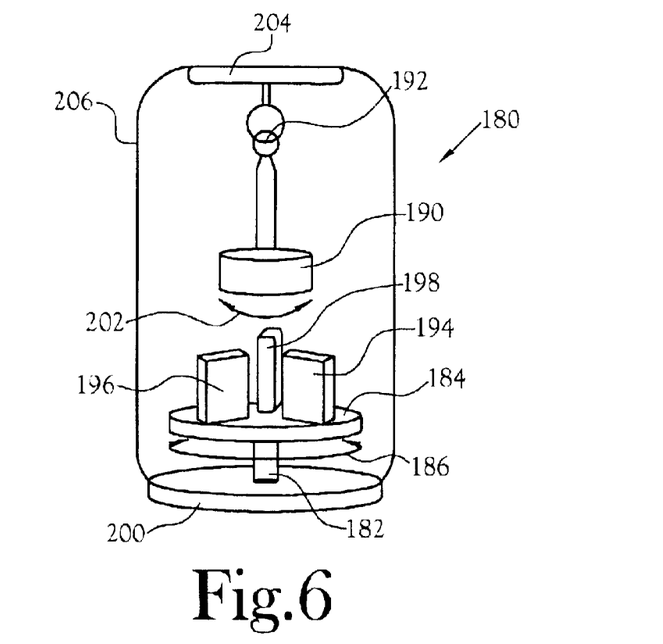
FIG. 6 is a perspective view of an alternative embodiment of FIG. 5a illustrating a swinging magnet dangling above a plurality of perimeter magnets that are rotatable on a first member about an axial member aligned under the swinging magnet.

An alternative embodiment is illustrated in FIGS. 6, 7, 8 and 9. As illustrated in FIG. 6, a chime system 180 includes an axial member 182 below a first support member 184. Axial member 182 serves as a pivot axis for the first support member 184, that is rotatable 186 in relation to a base 200. As the base is vibrated or moved, the first support member 184 is rotated 186, with rotation of a plurality of perimeter magnets 194, 196, 198 spaced apart on the first support member 184. The magnetic fields created by the north and south magnetic poles of each perimeter magnet 194, 196, 198 provide for alternating attraction and repelling of the magnetic field associated with a swinging magnet 190 supported by a swivel connector 192 from an upper bracket 204 connectable to a support bracket extended from a window or door (not shown). The upper bracket 204 may be attached to a device for playing a tune or for issuing a sequence of chimes (not shown) in proportion to the rate of swinging of magnet 190 supported by swivel connector 192 upon movement of a window or door. The base 200 is connected by a perimeter frame 206 to upper bracket 204, in order to maintain the perimeter magnets 194, 196, 198 in a position proximal to the swinging magnet 190. When the door or window is moved, the base 200 is moved, first support member 184 is moved, allowing for rotation of perimeter magnets 194, 196, 198, which set swinging magnet 190 into motion for triggering of the broadcast of a tune or a sequence of chimes (not shown), thereby alerting an occupant that a door or window has been opened.

Figure 7:
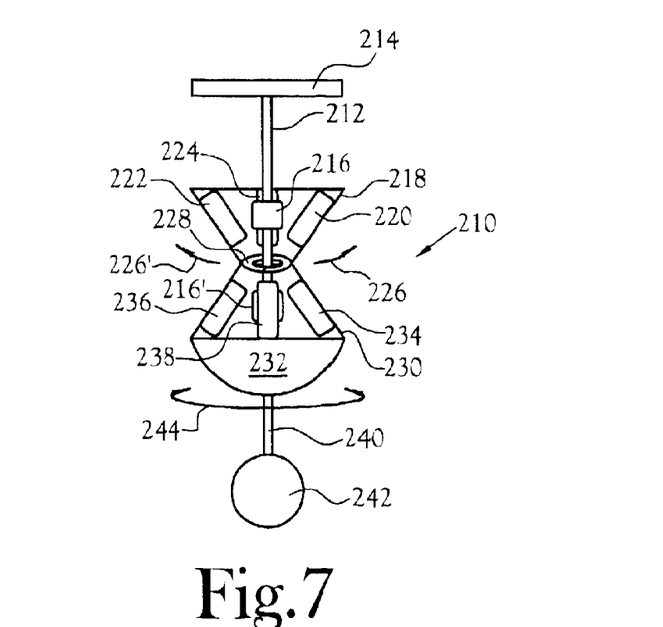
FIG. 7 is a side view of an alternative embodiment of an axial magnet suspended within a plurality of magnets oriented to rotate relative to the axial magnet.

An alternative embodiment is illustrated in FIG. 7, including a swinging fan connector 210 having an upper axial member 212 connected to an upper support bracket 214 that is connectable to a circulating ceiling fan (not shown). An axial magnet 216 may be fixed on the upper axial member 212 proximal to and positioned above a center connector ring 228. An alternative embodiment provides that axial magnet 216 is slidably attached (not shown) to upper axial member 212, for movement of the axial magnet 216 toward center connector ring 228, depending on the magnetic attraction and repelling forces of magnets positioned proximal to connector ring 228. An upper magnetic assembly includes an substantially cylindrical (not shown) or conical shaped (see FIG. 7) upper support frame 218 providing support for a first upper perimeter magnet 220, a second upper perimeter magnet 222, and a third upper perimeter magnet 224. Below the center connector ring 228 is positioned a lower magnetic assembly that includes a substantially cylindrical lower support member 232 and a conical shaped lower support frame 230 providing support for a first lower perimeter magnet 234, a second lower perimeter magnet 236, and a third lower perimeter magnet 238. A second axial magnet 216' is attached on a lower portion of the axial member 212 proximal to and positioned below the center connector ring 228. A lower axial member 240 is attached to the lower support member 232, and extends to a lower counter-weight 242. The upper axial member 212 is rotatable in unison with the upper support bracket 214 connectable to a reciprocating device such as a circulating ceiling fan. Upper magnets 220, 222, 224 are rotatable and are swinging 226, 226' in relation to the axial magnet 216, due to the magnetic fields created by the north and south magnetic poles of upper magnets 220, 222, 224 and the magnetic fields interaction with the magnetic field created by the north and south magnetic poles of axial magnet 216. Lower magnets 234, 236, 238 are rotatable in relation to second axial magnet 216'. Lower support member 232, lower axial member 240 and counter-weight 242 are rotatable 244 in relation to axial member 212 due to the magnetic fields created by the north and south magnetic poles of upper magnets 220, 222, 224 and the interaction of magnetic fields created by the north and south magnetic poles of lower magnets 234, 236, 238 and the second axial magnet 216'.

Figure 8A:
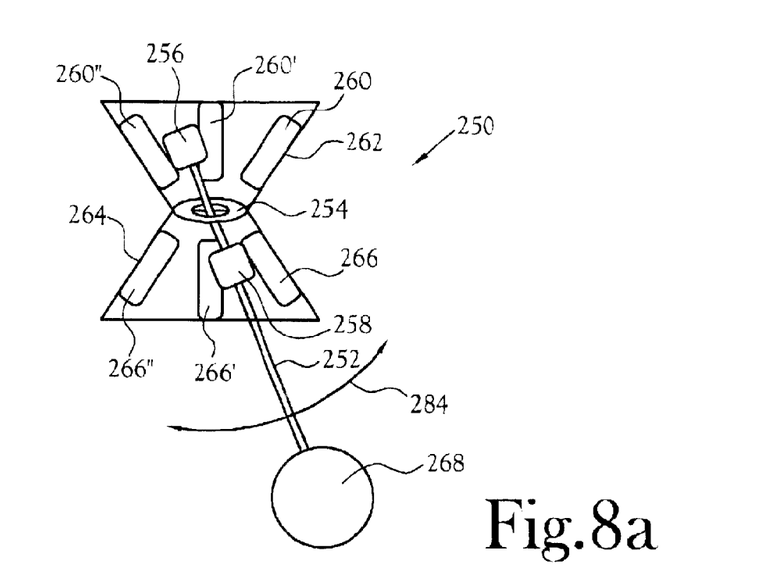
FIG. 8a is a perspective view of an alternative embodiment of FIG. 7, illustrating a gimbal orientation of a sleeve bearing positioned between a plurality of upper pairs and lower pairs of magnets.
Figure 8B:
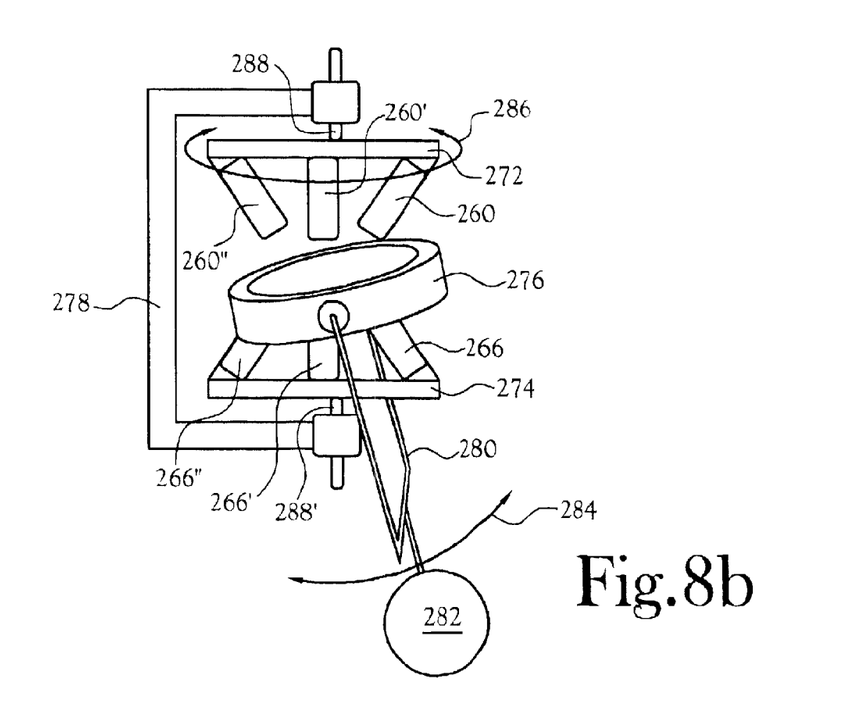
FIG. 8b is a perspective view of FIG. 8a illustrating a ring magnet positioned between a plurality of upper pairs and lower pairs of magnets.

An alternative embodiment is illustrated in FIGS. 8a and 8b, including a oscillating gimbal device 250 having an axial member 252 that reciprocates in reference to a gimbaled sleeve bearing 254 positioned at about a mid-portion of the axial member 252. The axial member 252 includes an upper axial magnet 256 and a lower axial magnet 258 disposed on the axial member 252 in respective positions above and below the gimbaled sleeve bearing 254. The upper axial magnet 256 is disposed within a plurality of upper magnets 260, 260', 260" supported within an upper frame 262 that is substantially a conical shaped member having one end with a smaller diameter proximal to sleeve bearing 254. The lower axial magnet 258 is disposed within a plurality of lower magnets 266, 266', 266" supported within a lower frame 264 that is substantially a conical shaped member having one end with a smaller diameter proximal to sleeve bearing 254. As the gimbal device 250 is moved by an external force, the upper axial magnet 256 and lower axial magnet 258 on axial member 252 oscillate to move pendulum weight 268 in a swinging motion 284 due to the magnetic fields created by the north and south magnetic pole of axial magnets 256, 258 and the interaction of magnetic fields of respective upper magnets 260, 260', 260" and lower magnets 266, 266', 266", to provide an oscillating gimbal device 250 for use as an amusement device.

An alternative embodiment of the device 250 is illustrated in FIG. 8b, including an oscillating and rotating gimbal device 270 having a central ring magnet 276 that reciprocates in reference to an upper bracket 272 and a lower bracket 274. The upper bracket 272 is connected at a pivot 288 to a side supporting bracket 278, with the upper bracket 272 supporting a plurality of upper magnets 260, 260', 260".

The lower bracket 274 is connected at a pivot 288' to the side supporting bracket 278, with the lower bracket 274 supporting a plurality of lower magnets 266, 266', 266". The ring magnet 276 oscillates between upper magnets 260, 260', 260" and lower magnets 266, 266', 266", to move pendulum weight 268 in a swinging motion 284 due to the magnetic fields created by the north and south magnetic pole of axial magnets ring magnet 276 and the interaction of magnetic fields of respective upper magnets 260, 260', 260" and lower magnets 266, 266', 266", to provide an oscillating and rotating gimbal device 270 for amusement. A pendulum weight 282 may be attached by bracket 280 to ring magnet 276.

Figure 9:
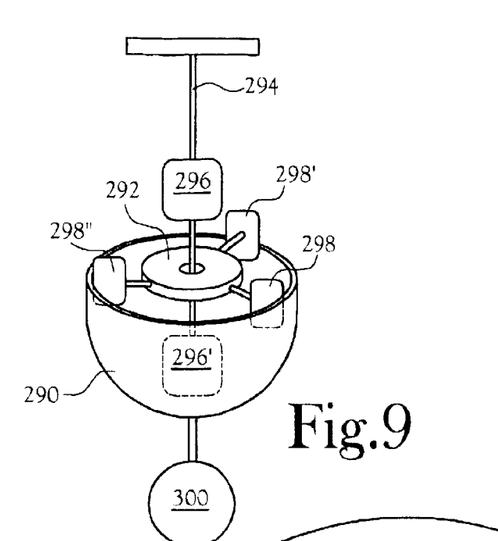
FIG. 9 is a perspective view of an alternative embodiment illustrating a plurality of perimeter magnets positioned around a magnetic bearing assembly aligned with an axial member having axial magnets thereon.

An alternative embodiment is illustrated in FIG. 9, including a water buoy cylindrical shaped housing 290 enclosing a central magnet ring 292 having a hole therein to allow the central magnet ring 292 to move up, down, and to rotate about an axial member 294 extended into a mid-portion of the cylindrical shaped housing 290. The central magnet ring 292 includes a plurality of perimeter magnets 298, 298', 298" attached in spaced apart orientation to the perimeter surface of the magnet ring 292. The central magnet ring 292 and perimeter magnets 298, 298', 298" are rotatable about the axial member 294, and are freely levitated between an upper axial magnet 296 and a lower axial magnet 296'. To maintain the cylindrical shaped housing 290 in a substantially upright position when floating in water, a counterweight 300 is attached to the lower portion of the cylindrical shaped housing 290. The movement of the central magnet ring 292 and perimeter magnets 298, 298', 298"are influenced to rotate and levitate within the cylindrical shaped housing 290 due to the magnetic fields created by the north and south magnetic pole of central ring magnet 292, upper axial magnet 296, lower axial magnet 296', and the interaction of magnetic fields of the plurality of perimeter magnets 298, 298', 298".

Figure 10:
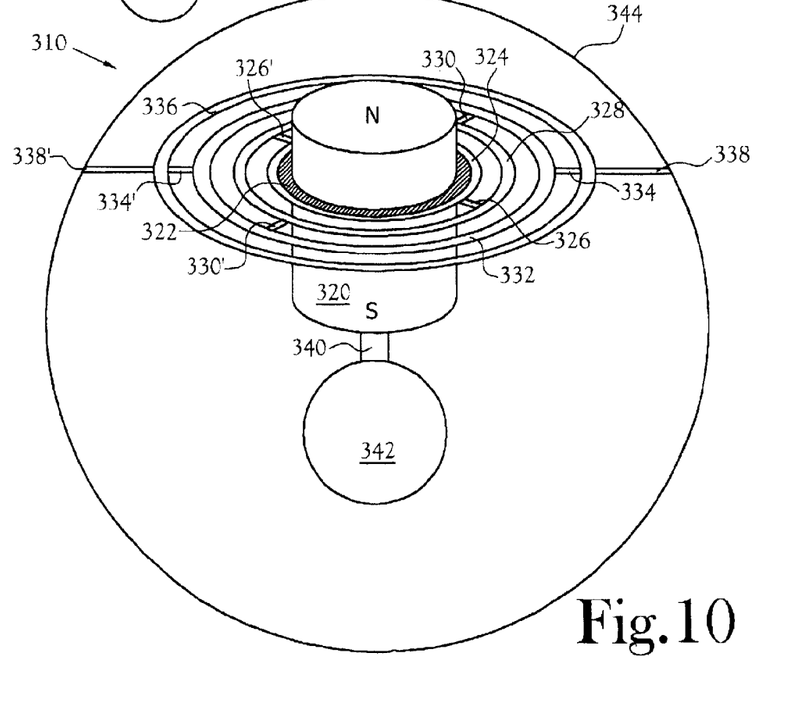
FIG. 10 is perspective view of an alternative embodiment of a plurality of annular magnets disposed to pivot in a plurality of orientations relative to each other.

An alternative embodiment is illustrated in FIG. 10, including a multi-pivoting device 310 for amusement. The device 310 includes a central axial magnet having one end with a north pole 322 and having an opposed end with a south pole 324. The axial magnet 320 is encircled by a plurality of concentrically positioned rings 328, 332, 336 composed of magnetic material, with each ring separated by respective pairs of means for pivoting. The axial magnet 320 includes a perimeter ledge 322 disposed at about a mid-portion of the sides, with the perimeter ledge 322 having an outer rim 324 that may be magnetized. The rim 324 includes at least two inner pivot members 326, 326' positioned on opposed sides of the rim 324, with an inner magnet ring 328 supported in a pivoting orientation by the inner pivot members 326, 326'. A middle magnet ring 332 is supported in a pivoting orientation by inner pivot members 326, 326' connected between the inner magnet ring 328 and the middle magnet ring 332. An outer magnet ring 336 is supported to enclose middle magnet ring 332 in a pivoting orientation by pivot members 334, 334'. A second member 340 is attached to one end of the axial magnet 320, with the second member 340 extended to connect with a weight 342 that serves as a pendulum member for axial magnet 320. The pivoting device 310 is enclosed within a shell housing 344, with pivot members 338, 338' connecting the shell housing 344 to the outer magnet ring 336. When the shell housing 344 is moved, the plurality of magnetized rings 328, 332, 336 are each separately pivotable in relation to axial magnet 320 due to the magnetic fields created by the north and south magnetic pole of axial magnet 320 and the interaction of magnetic fields of each magnetic ring 328, 332, 336, to provide a multi-ringed, moving device 310.

Figure 11:
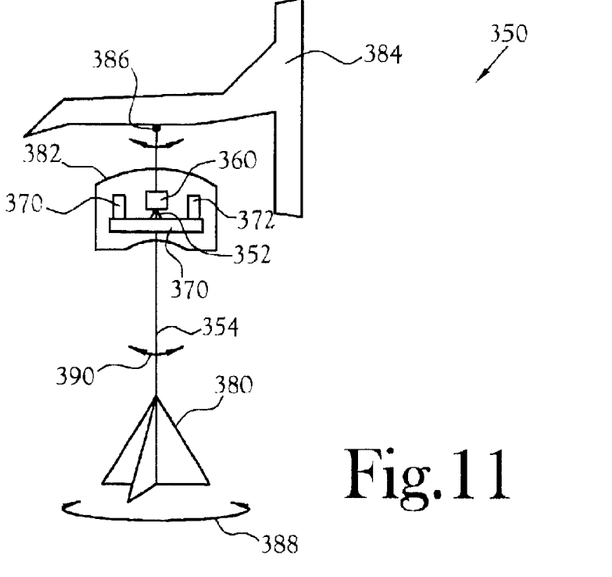
FIG. 11 is a side view of an alternative embodiment having a magnet on an axial member connected to a plurality of magnets on a first member with the magnet on the axial member influenced by wind.

An alternative embodiment is illustrated in FIG. 11, including a magnetically coupled system 350 for a wind measuring gage and/or wind chime. The system 350 includes central magnet 360 connected to axial member 354 for support of a wind vane 390. Central magnet 360 is disposed above a rotatable first support member 370 having at least two perimeter magnets 370, 372 thereon. The first support member 370 is supported below the pivot axis 352 and central magnet 360 by a rotating connector bracket (not shown) that allows first support member 370 to rotate in relation to the axial member 354. The axial member 354 is connectable by a swivel connection 386 to a mounting bracket 384 that extends the system 350 apart from a building, tree, or other support member (not shown). The central magnet 360 is positioned proximal to and above, but not attached directly to the first support member 370, on which the perimeter magnets 370, 372 are positioned in a spaced apart configuration along the perimeter surface of first support member 370. When the wind vane 380 rotates 388 and/or swings 390 due to the wind, the central magnet 360 is rotated, and the perimeter magnets 370, 372 are simultaneously attracted and repulsed by magnetic forces from central magnet 360, with resulting movement in a rotating motion of the first support member 370. The first support member 370 is enclosed in a transparent cover 382 to shield first support member 370 and central magnet 360 from influence from the wind, and to allow the movement of first support member 370 to be visible to a person nearby, either from inside a building or from an outside position near the mounting bracket 384.

Figure 12:
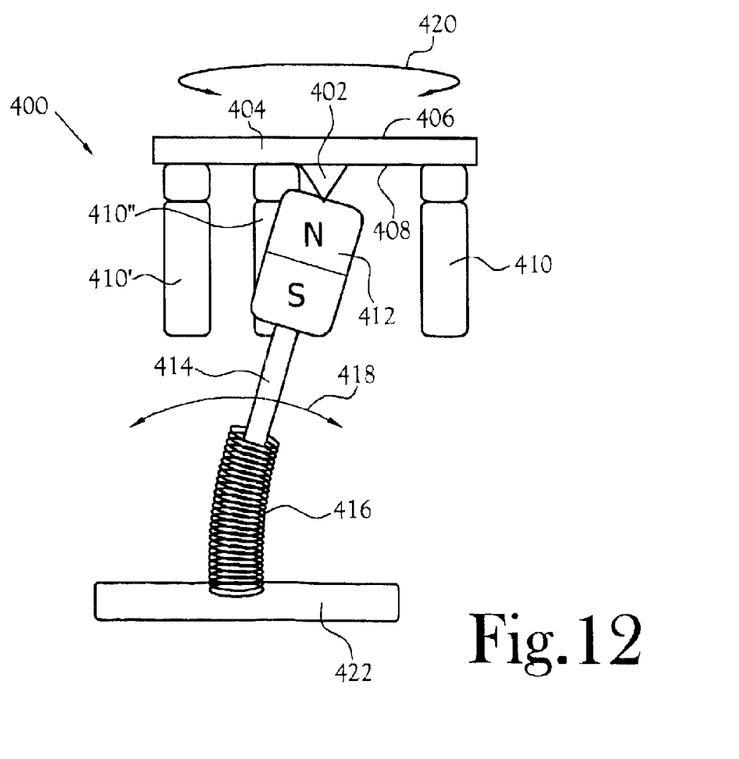
FIG. 12 is a side view of an alternative embodiment including a pivoting axial magnet supporting a plurality of magnets pivotably suspended above the axial magnet.

An alternative embodiment is illustrated in FIG. 12, including a spring loaded pivot system 400 for balancing a plurality magnets that are disposed to pivot and to rotate in relation to a pivot axis 402 of a first support member 404. The first support member 404 includes a first surface 406 and an underside surface 408 having a plurality of perimeter magnets 410, 410', 410" disposed at a perimeter surface of the underside surface 408. The pivot axis 402 of the first support member 404 is balanced upon an axial magnet 412 suspended above a support surface 422 by a second support member 414 attached in axial alignment with a spring mount 416. The spring mount 416 allows the second support member 414 and axial magnet 412 to laterally reciprocate 418. The balancing of first support member 404 at the pivot axis 402 above the axial magnet 412 allows the first support member 404 and perimeter magnets 410, 410', 410" to rotate and tilt 420 in relation to the axial magnet 412. Upon movement of the support surface 422, the magnetic fields of each perimeter magnet 410, 410', 410" influence the lateral reciprocation 418 of the axial magnet 412 due to the magnetic fields created by the north and south magnetic pole of axial magnet 412, to provide a spring loaded pivot system 400 that is maintain in motion by the interaction of a plurality of magnetic forces from a plurality of magnets disposed in an orientation allowing for tilting and rotating. The spring loaded pivot system 400 may be utilized to support a reciprocating ornamental design or as a base for a reciprocating animation object (not shown).

The present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details of the apparatus and method of use, and is not limited to the illustrative embodiments shown and described. Accordingly, departures may be made from such details of the apparatus and method of use without departing from the spirit or scope of applicants' general inventive concept.

Having thus described the aforementioned invention, I claim:

1. An apparatus for producing magnetically induced movement, comprising:
    a first member having a first surface;
    a pivot axis spatially fixed central of said first surface, said first member is reciprocatingly movable relative to said pivot axis;
    a first magnet disposed on said first surface, said first magnet having a first magnet axis defined by a first magnet north pole and a first magnet south pole, said first magnet axis disposed substantially circumferential to said pivot axis, said pivot axis being substantially perpendicular to said first surface;
    a second magnet having a first end spatially fixed relative to said pivot axis, said second magnet having a second magnet axis defined by a second magnet north pole and a second magnet south pole, said second magnet axis aligned with said pivot axis; and
    a second member attached to said second magnet;
    whereby said second member pivots relative to said first member as the second magnet is attracted relative to said first magnet by a magnetic force and moved away from said first magnet by a gravity force, thereby providing for reciprocating movement of said first member about said pivot axis.

2. The apparatus of claim 1 further comprising at least one third magnet fixed to said first surface, said at least one third magnet having a third magnet axis defined by a third magnet north pole and a third magnet south pole.

3. The apparatus of claim 2 wherein said first magnet north pole is oriented towards said pivot axis and said at least one third magnet north pole is oriented towards said pivot axis, said second magnet is positioned proximal to said first surface and between said first magnet and said at least one third magnet.

4. The apparatus of claim 2 wherein said first magnet south pole is oriented towards said pivot axis and said at least one third magnet south pole is oriented towards said pivot axis.

5. The apparatus of claim 2 wherein said first magnet north pole is oriented substantially perpendicular in relation to said pivot axis and said at least one third magnet north pole is oriented substantially perpendicular of said pivot axis, said second magnet is positioned proximal to said first surface and between said first magnet and said at least one third magnet.

6. The apparatus of claim 5 wherein said first magnet south pole is oriented substantially perpendicular in relation to said pivot axis and said at least one third magnet south pole is oriented substantially perpendicular in relation to said pivot axis.

7. The apparatus of claim 1 further comprising at least one magnetic ring disposed to encircle said first surface, said at least one magnetic ring having a ring axial center oriented parallel to said pivot axis passing through said pivot axis of said first surface, said at least one magnetic ring having an inner circumference defining a north magnetic pole and having an outer circumference defining a south magnetic pole.

8. The apparatus of claim 7 wherein said at least one magnetic ring is sized to enclose said first magnet and said second magnet therein, said at least one magnetic ring is pivotable relative to said ring axial center, said at least one magnetic ring is connected to said support bracket whereby said first member having said first surface is reciprocatingly moved within said at least one magnetic ring and said first member is disposed for reciprocating movement in relation to the movable object.

9. The apparatus of claim 7 wherein said second member is attached to said second magnet is disposed within said at least one magnetic ring, said second member including a second end having a pendulum member attached at said second end opposed from said second magnet, said second member and said pendulum member rotates within said at least one magnetic ring.

10. A motion conversion system utilizing a plurality of magnets for producing magnetically induced movement in relation to a movable object, comprising:
    a first member having a connector attached at a central position of said first member;
    an axial member connected to said connector of said first member, said first member pivotable in relation to said axial member;
    attaching means having a first end connected to said first member, said attaching means having a second end releasably attachable to a movable object whereby said first member is disposed for reciprocating movement in relation to the movable object;
    a plurality of first magnets disposed in a spaced apart configuration on said first member, each of said plurality of first magnets having a magnetic field of sufficient strength to overlap said axial member; and
    at least one axial magnet positioned on said axial member, said at least one axial magnet having a magnetic field of sufficient strength to be influenced by the magnetic field of each of said plurality of first magnets;
    whereby said at least one axial magnet and said axial member pivot in relation to said first member as said at least one axial magnet is repulsed by the magnetic field of each of said plurality of first magnets, thereby pivoting said axial member in relation to said plurality of first magnets and said first member.

11. The motion conversion system of claim 10 wherein said plurality of first magnets are disposed in a radial orientation on said first member to encircle said at least one axial magnet, said first member is connected by means for attaching to a movable object whereby said first member is disposed for reciprocating movement in relation to the movable object.

12. The motion conversion system of claim 11, further comprising a second axial magnet supported on said axial member below said first member, said second axial magnet and said at least one axial magnet positioned on said axial member are alternately attracted and repelled by each of said plurality of first magnets by respective magnetic forces of each of said first magnets, thereby pivoting said axial member in relation to said plurality of first magnets and said first member.

13. An apparatus for producing magnetically induced movement, comprising:
    a first member including a perimeter surface bounding a central opening;
    an axial member positioned proximal to said first member, said axial member having at least one axial magnet disposed thereon, said at least one axial magnet disposed to reciprocate in relation to said first member, said at least one axial magnet having a magnet axis defined by a magnet north pole and a magnet south pole;

a first, second and third magnet disposed at spaced apart intervals proximal to said perimeter surface of said first member, said first magnet having a first magnet axis defined by a first magnet north pole and a first magnet south pole, said first magnet axis is disposed substantially circumferential to said axial member and said first member, said second magnet having a second magnet axis defined by a second magnet north pole and a second magnet south pole, said second magnet axis disposed substantially circumferential to said axial member, said third magnet having a third magnet axis defined by a third magnet north pole and a third magnet south pole, said third magnet axis disposed substantially circumferential to said axial member and said first member; and a second member disposed adjacent to said first member, said second member having a second member central opening aligned with said first member central opening, said axial member extends between respective first member and second member central openings;

whereby said at least one axial magnet is alternately attracted and repelled in relation to said first, second and third magnets by respective magnetic attraction forces with resulting rotation of said first member in relation said axial member.

14. The apparatus of claim 13 further comprising:

said at least one axial magnet including a first axial magnet attached above said central opening of said first member and a second axial magnet attached below said central opening of said first member;

said second member having a first, second and third magnet disposed at spaced apart intervals proximal to a second perimeter of said second member; and said second member having a pendulum weight attached to an exterior surface in axial alignment with said second axial magnet;

whereby said second axial magnet is alternately attracted and repelled relative to said first, second and third magnets on said second member by respective magnetic attraction forces with resulting rotation of said axial member and said second member in relation to each other.

15. The apparatus of claim 13 wherein said first member is disc shaped, said second member is cylindrical, said second member having a pendulum weight attached to reciprocate said second member in relation to said first member, said axial member having a first and second axial magnet attached thereon, said first and second axial magnet positioned on opposed sides of a sleeve bearing disposed between said first member and said second member, said sleeve bearing disposed to slidably move along said axial member as said first member rotates and said second member is reciprocated in relation to said first member.

16. The apparatus of claim 13 wherein said first member further including an upper support member and said second member including a lower support member positioned to rotate around said axial member, said upper support member includes a ring shaped member having said first, second and third magnet disposed at spaced apart intervals therein, said lower support member includes a ring shaped member having a like-configured first, second and third magnet disposed at spaced apart intervals therein, said at least one axial magnet disposed to slidably move along said axial member as said upper support member and said lower support member rotate around said axial member.

17. An apparatus for producing magnetically induced movement, comprising:

a first member including a perimeter surface bounding a central pivot point, said central pivot point aligned with an axis of said first member;

a first, second and third magnet disposed at spaced apart intervals proximal to said perimeter surface of said first member, said first magnet having a first magnet axis defined by a first magnet north pole and a first magnet south pole, said first magnet axis disposed substantially circumferential to said axis of said first member, said second magnet having a second magnet axis defined by a second magnet north pole and a second magnet south pole, said second magnet axis disposed substantially circumferential to said axis of said first member, said third magnet having a third magnet axis defined by a third magnet north pole and a third magnet south pole, said third magnet axis disposed substantially circumferential to said axis of said first member;

a second member disposed adjacent to said first member, said second member including a second perimeter surface bounding a central pivot point, said central pivot point aligned with said axis of said first member;

said first member and said second member are pivotably supported at a spaced apart distance of separation by a support member disposed lateral of said first member and second member;

a ring magnet disposed to pivot between said first member and said second member, said ring magnet having a pivot axis coinciding with said aligned central pivot point of said second member and said axis of said first member; and said ring magnet having a pendulum weight attached by a bracket to said ring magnet, said pendulum weight in axial alignment with said pivot axis of said ring magnet, said ring magnet and pendulum weight are reciprocated in relation to said first member and said second member;

whereby said ring magnet is alternately attracted to said first, second and third magnets of said first member and said second member by respective magnetic attraction forces, said ring magnet is alternatively repelled from said first, second and third magnets of said first member and said second member by respective magnetic repelling forces thereby said ring magnet is pivotable in relation said first and second members without an axial connection between said ring magnet and said first or said second members.

18. An apparatus for producing magnetically induced movement, comprising:

a plurality of concentric circular members pivotably connected to each other, each of said circular members suspended by respective pairs of means for pivoting, said plurality of concentric circular members composed of magnetic material, said plurality of concentric circular members contained within a cylindrical member; and an axial magnet disposed at an axis of said plurality of concentric circular members, said axial magnet includes a magnet north pole and a magnet south pole aligned with said axis of said plurality of concentric circular members, said magnet north pole and magnet south pole having a magnetic field of sufficient strength to influence movement of the magnetic material of said plurality of concentric circular members.

19. An apparatus for producing magnetically induced movement, comprising:

a first member including a perimeter surface bounding a central pivot point on an underside surface of said first member, said central pivot point aligned with an axis of said first member;

a first, second and third magnet disposed to extend downwardly at spaced apart intervals proximal to said perimeter surface of said first member, said first magnet having a first magnet axis defined by a first magnet north pole and a first magnet south pole, said first magnet axis disposed substantially circumferential to said axis of said first member, said second magnet having a second magnet axis defined by a second magnet north pole and a second magnet south pole, said second magnet axis disposed substantially circumferential to said axis of said first member, said third magnet having a third magnet axis defined by a third magnet north pole and a third magnet south pole, said third magnet axis disposed substantially circumferential to said axis of said first member; and an axial member pivotably supporting said first member, said axial member having an axial magnet positioned to support said pivot point of said first member, said axial member having a distal end opposed from said axial magnet, said distal end supported by a spring means above a supporting surface;

whereby said axial member oscillates in a swinging movement in relation to the supporting surface, said first member is rotatable about said pivot point in relation to said axial magnet as said first, second and third magnets are alternately attracted and repelled by said axial magnet disposed within said first, second and third magnets.

20. An apparatus for producing magnetically induced movement, comprising:

a first member having a first surface;

a pivot axis spatially fixed central of said first surface;

a first magnet disposed on said first surface, said first magnet having a first magnet axis defined by a first magnet north pole and a first magnet south pole, said first magnet axis disposed substantially circumferential to said pivot axis, said pivot axis being substantially perpendicular to said first surface;

a second magnet having a first end spatially fixed relative to said pivot axis, said second magnet having a second magnet axis defined by a second magnet north pole and a second magnet south pole, said second magnet axis aligned with said pivot axis, whereby said second magnet is held in a spatially fixed position at about said pivot axis by magnetic attraction and repulsion relative to said first magnet on said first surface of said first member, said first member is connected to a support bracket having an attaching means for connection of said support bracket to a movable object whereby said first member is disposed for reciprocating movement in relation to said movable object; and a second member attached to said second magnet;

whereby said second member pivots relative to said first member as the second magnet is attracted relative to said first magnet by a magnetic force and moved away from said first magnet by a gravity force, thereby providing for reciprocating movement of said first member about said pivot axis.

* * * * *